(12) United States Patent
Burton et al.

(10) Patent No.: US 6,253,206 B1
(45) Date of Patent: Jun. 26, 2001

(54) METHOD AND APPARATUS FOR A COMMERCIAL NETWORK SYSTEM DESIGNED TO FACILITATE, MANAGE AND SUPPORT THE IMPLEMENTATION AND INTEGRATION OF TECHNOLOGY SYSTEMS

(75) Inventors: Tom C. Burton; Lorin E. Jeter; Scott A. Marshall, all of Santa Barbara, CA (US)

(73) Assignee: Inroads Technology, Inc., Santa Barbara, CA (US)

( * ) Notice: Subject to any disclaimer, the term of this patent is extended or adjusted under 35 U.S.C. 154(b) by 0 days.

(21) Appl. No.: 09/378,305

(22) Filed: Aug. 20, 1999

(51) Int. Cl.[7] .................................................. G06F 17/30
(52) U.S. Cl. ............................................................ 707/103
(58) Field of Search ..................................... 707/103, 102, 707/104, 100, 2, 1; 705/9; 700/83; 370/408

(56) References Cited

U.S. PATENT DOCUMENTS 5,321,610 * 6/1994 Breslin ..................................... 705/9
5,651,006 * 7/1997 Fujino et al. ........................ 370/408
6,067,477 * 5/2000 Wewalaarachchi et al. .......... 700/83

* cited by examiner

*Primary Examiner*—Hosain T. Alam
*Assistant Examiner*—Sanjiv Shah
(74) *Attorney, Agent, or Firm*—Blakely Sokoloff Taylor & Zafman

(57) ABSTRACT

A system in which the implementation and integration of technology systems is facilitated, managed and supported regardless of the type of technology system being implemented. An implementation plan and strategy is developed that will ensure the highest probability of success and will be time and cost effective. The creation of implementation deliverables such as project schedules and plans is streamlined. Users are able to access, communicate with and share implementation and integration strategies with each other. An "implementation template" is created based upon specific implementation requirements. A common framework, marketplace and community is provided where businesses, vendors, consultants and other experts can communicate and share implementation information data in a useful and workable manner. A mechanism is provided for pricing and billing of implementation templates and tools. Expert analysis is provided surrounding a specific technology system implementation using historical "like kind" implementation data and knowledge bases.

10 Claims, 22 Drawing Sheets

METHOD AND APPARATUS FOR A COMMERCIAL NETWORK SYSTEM DESIGNED TO FACILITATE, MANAGE AND SUPPORT THE IMPLEMENTATION AND INTEGRATION OF TECHNOLOGY SYSTEMS

BACKGROUND OF THE INVENTION

Businesses spend billions of dollars on year on software and hardware-based technology systems. Technology systems range from simple software packages such as Microsoft Word to sophisticated hardware and software systems that automate strategic business and manufacturing processes. Whether the technology system is purchased from one or more outside vendors or is developed "in-house" the challenge that businesses face is getting the technology system implemented and deployed (within a reasonable timeframe and budget) such that the system is being utilized within the business and a return on investment is being recognized.

Unfortunately this challenge is not easily overcome by many businesses. As a result many technology systems that are purchased or developed are never implemented or are only partially implemented. Worse yet, most businesses grossly underestimate the implementation process which result in large schedule and budget overruns.

Traditionally businesses have looked to external consulting and professional service organizations to assist with and support the implementation of technology systems. However, in many cases the implementation services provided by external consultants and service organizations has proven to be very expensive and inconsistent in quality. This has caused many businesses to attempt the implementation of technology systems using "in-house" resources. Unfortunately this approach has also proven to be ineffective as internal resources generally do not have the experience or expertise to manage the implementation of technology systems. As a result, traditional implementation approaches are generally ineffective, costly and do not yield successful results.

Vendors of technology systems are also impacted by this problem as the long-term viability of a technology system vendor depends on the success of their customers and their ability to ensure that their technology systems are quickly and effectively implemented. The long-term viability of consulting and professional organizations also relies on the quality of the implementation services provided to their clients. Due to the shortage of qualified technical resources many consulting and professional services companies are having difficulty recruiting and retaining first class resources. This situation is forcing consulting and professional service organizations to hire less qualified and skilled resources while charging higher rates to their clients.

In order to alleviate these problems vendors and implementation service providers have developed "implementation methodologies and processes" for implementing various technology systems. The purpose of these methodologies and processes is to attempt to ensure that the implementation process for a particular technology system or class of systems is repeatable from business to business and consultant to consultant. Many vendors and implementation service providers have made these methodologies and processes available to their customers and clients for their own internal use. Several vendors such as Computer Associates with their Process Continuum product have developed software to augment and support the use of these methodologies. Libraries of "online methodologies" have been developed and are being sold by third party companies such as James Martin that work as an input to the Process Continuum software. The Process Continuum software and related libraries are marketed directly to businesses with the goal of enabling businesses to take advantage of proven methodologies and best practices.

Unfortunately, despite the number of methodologies and related products that are available on the market today, the technology system implementation and integration issues introduced previously are not being successfully addressed. This is because the methodologies that are available are developed to be "one size fits all" and, as a result, do not create an implementation plan and strategy which takes into consideration the specific technology system that is being implemented, the specific functionality of the system that will be implemented or the end user environment where the system will be implemented. They do not examine and take into consideration the specific cultural and "people" issues that impact technology system implementations. They do not enable users to draw upon encapsulations of implementation tools and historical "like kind" implementation data nor do they allow a user to encapsulate and share their own implementation data, tools and strategies with others. In today's business environment each technology system implementation is unique. As a result implementation plans, strategies and approaches must take into consideration the uniqueness of each individual implementation. The "one size fits all" methodology is limited in its usefulness in today's business environment.

The bottom line is that neither the use of consultants nor the use of existing packaged libraries of implementation methodologies is a sufficient solution to the challenges associated with implementing and integrating varied technology systems. What is needed is a universally accessible system which is designed to facilitate and manage the implementation and integration of technology systems as opposed to simply providing a methodology. This system should be able to support an unlimited number of technology system implementations over time and be able to address and handle each implementation as a unique entity. It should allow businesses that are implementing technology systems to encapsulate the knowledge and techniques garnered in a technology system implementation and then draw on those encapsulations for formulating implementation strategies for similar implementations. It should allow businesses to build an "implementation template" and strategy based upon their unique implementation and integration requirements. The system should facilitate access by and communication with outside consultants, technology vendors and other implementation experts in an efficient and cost-effective manner. This new system should take full advantage of computers, databases, and the Internet and related on-line networks to allow for entirely new features and quality of service that were previously unavailable.

SUMMARY OF THE INVENTION

To address the foregoing problems which exist in the prior art, the present invention provides a system in which the implementation and integration of technology systems is facilitated, managed and supported regardless of the type of technology system being implemented. An implementation plan and strategy is developed that will ensure the highest probability of success and will be time and cost effective. The creation of implementation deliverables such as project schedules and plans is streamlined. The invention allows users to access, communicate with and share implementation and integration strategies with each other. An "implementation template" is created based upon specific implementation requirements. A common framework, marketplace and community is provided where businesses, vendors, consultants and other experts can communicate and share implementation information data in a useful and workable manner. A mechanism is provided for pricing and billing of implementation templates and tools. The invention also provides expert analysis surrounding a specific technology system implementation using historical "like kind" implementation data and knowledge bases.

DETAILED DESCRIPTION OF THE INVENTION

System Architecture

Figure 1:
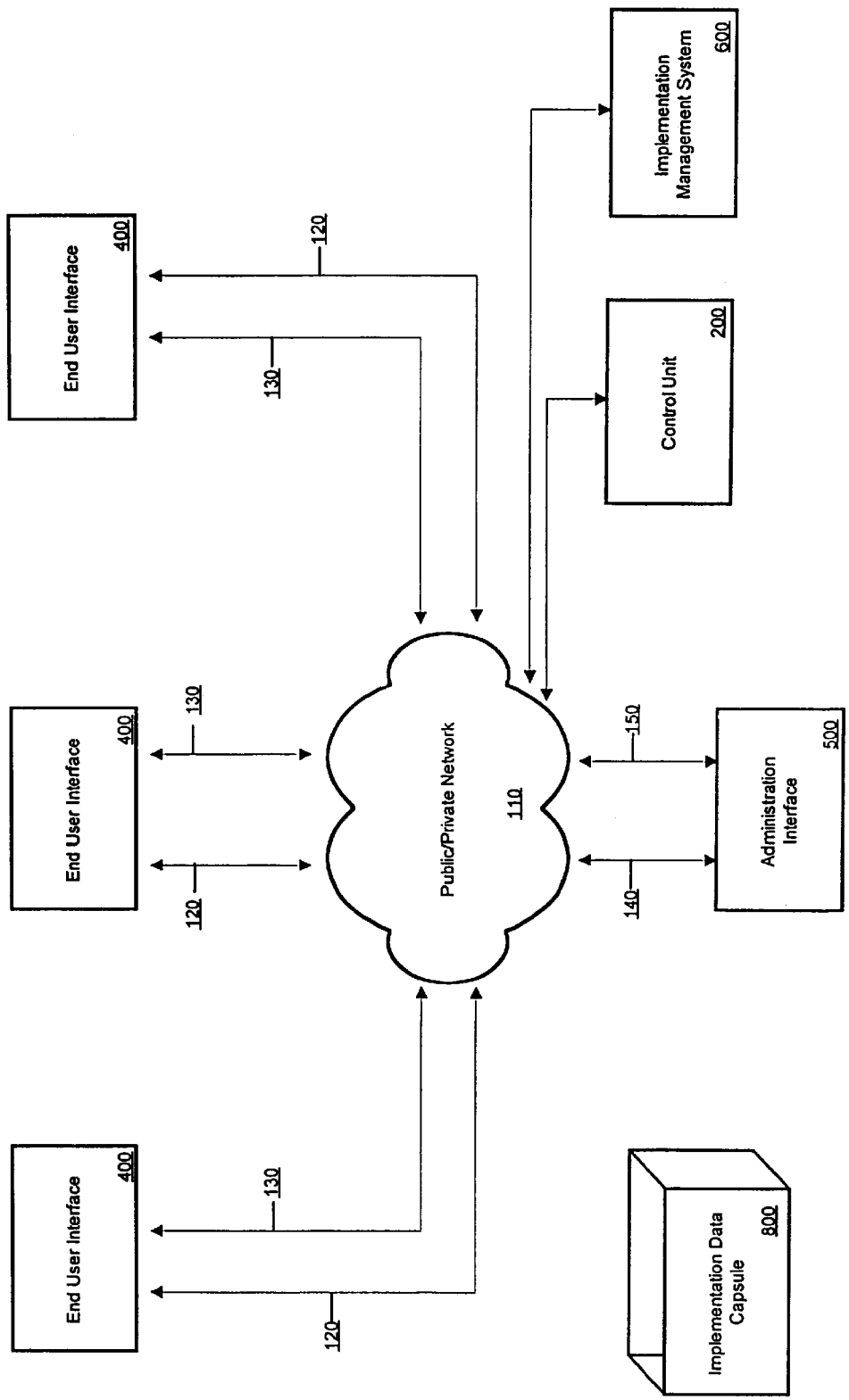
FIG. 1 illustrates a first embodiment of the present invention.

The system architecture of a first embodiment of the apparatus and method of the present invention is illustrated with reference to FIGS. 1 through 8. As shown in FIG. 1, the apparatus of the present invention comprises End User Interface 400, Control Unit 200, Implementation Management System 600, and Administration Interface 500 (collectively the "nodes"). Each node interacts with another through a public and/or private network 110, provided by a local or regional telephone company or alternatively provided by an internal organization within a business entity. Connection may also be provided by dedicated data lines, cellular, Personal Communication Systems ("PCS"), microwave, wireless or satellite networks. In a preferred embodiment, the nodes are connected via the Internet. End User Interface 400 and Administration Interface 500 are the input and output gateways for communication with the Control Unit 200 and the Implementation Management System 600.

Implementation Data Capsule 800 is used to transfer implementation data between the Control Unit 200 and Implementation Management System 600 and end user interface 400 and administration interface 500.

Using the above components, the present invention provides a method and apparatus for a commercial network system designed to facilitate, manage, and support the implementation and integration of technology systems.

Transactions fall into two categories: control unit transactions 120 and implementation management system transactions 130. Each category of transaction occurs between the end user interface 400 or in the case of administrative transactions, the administration interface 500, and the control unit 200 or the implementation management system 600. Administrative transactions between the administration interface 500 and the control unit 200 or implementation management system 600 are managed by control unit administration transaction 150 and implementation management system administration transaction 140 respectively. Some transactions will utilize the implementation data capsule 800 to package together implementation data accessible to the control unit 200 and the implementation management system 600. The implementation data capsule 800 can then be manipulated through various mechanisms by the end user. An example of this manipulation would be an end user identifying an implementation data capsule 800 located on the control unit 200 and wishing to transfer the implementation data capsule from the control unit to their end user interface 400. This would be accomplished using a control unit transaction 120 initiated from end user interface 400.

Figure 2:
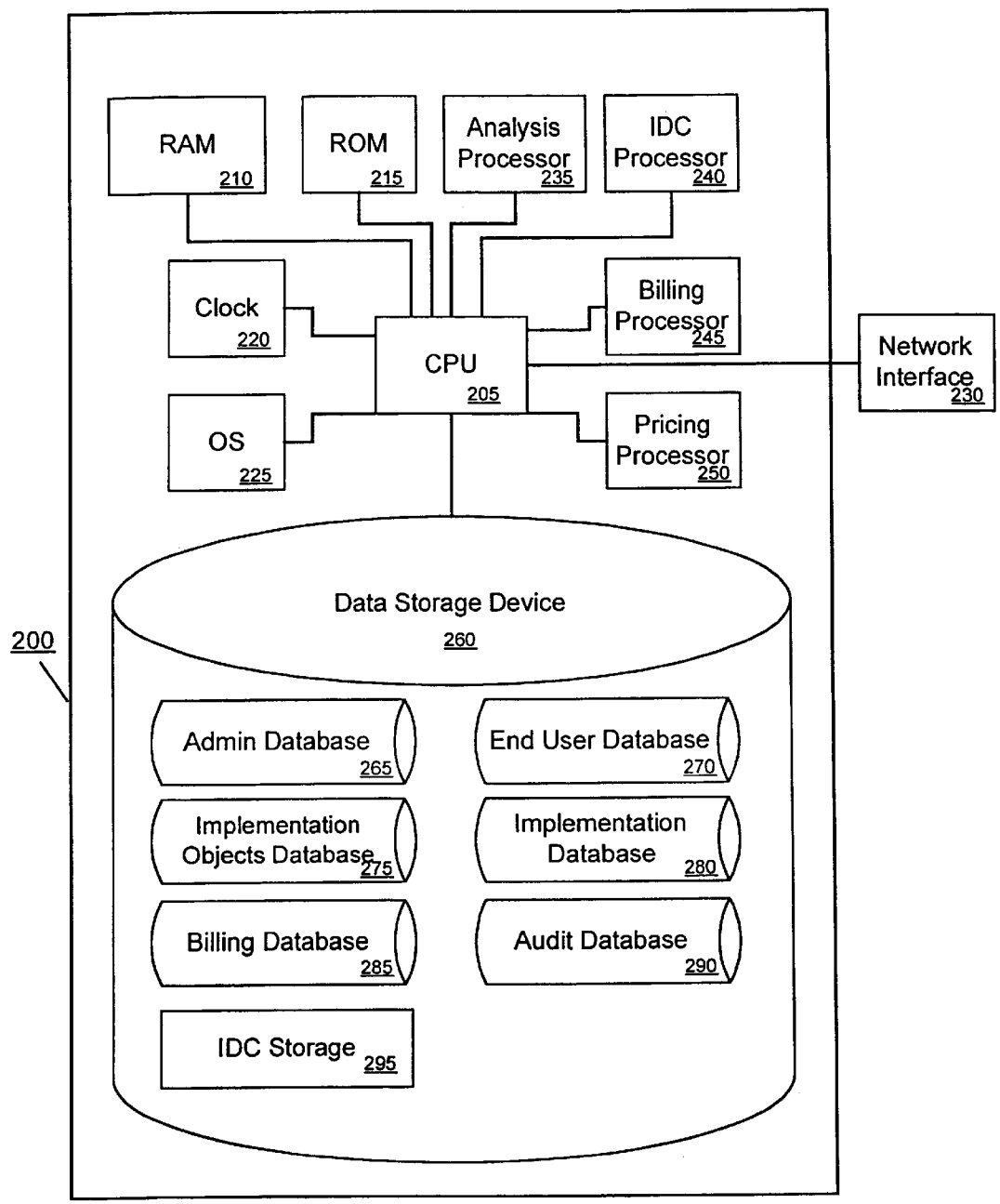
FIG. 2 is a block diagram showing one embodiment of the Control Unit.

As shown in FIG. 2, one preferred embodiment of the control unit 200 includes central processor (CPU) 205, RAM 210, ROM 215, clock 220, Operating System 225, network interface 230, analysis processor 235, implementation data capsule (IDC) processor 240, billing processor 245, pricing processor 250, and data storage device 260.

A conventional personal computer or computer workstation with sufficient memory and processing capability may be used as a control unit 200. In the preferred embodiment it operates as a web server, both receiving and transmitting data inquires generated by end users. Control Unit 200 should generally be capable of high volume transaction processing, performing a significant number of mathematical calculations in processing communications and database searches. A Pentium processor such as the 400 MHz Pentium III, commonly manufactured by Intel Corp., may be used for CPU 205. This processor employs a 32-bit architecture. Equivalent processors from such companies as Motorola Corp. and Sun Microsystems Inc. can be substituted.

Referring again to FIG. 2, analysis processor 235, IDC processor 240, billing processor 245, and pricing processor 250 comprise software subsystems that provide specialized functions for control unit 200. These subsystems are invoked appropriately as determined by the transactions requested from control unit 200.

Analysis processor 235 provides the capability to search for and analyze information in data storage device 260 and return the information to the end user. End user requests involving queries can also be handled. Such requests are useful in determining if trends and patterns exist in the information stored in data storage device 260. The results of these requests are then reported to the end user or administrator. Functions executed by analysis processor 235 may be supported by commercially available software, such as the Dimension Series Suite from Neo Vista Software, Inc. The Dimension Series Suite consists of data mining engines that organize the relationships between the information stored in data storage device 260. An end user request, such as "Tell me all implementations that utilize Visual Basic in Microsoft Windows NT Environments", would be interpreted and passed to the data mining engines which would in turn search the databases for relevant information. The results of the operation would be returned to the end user. Subsequent requests are re-submitted if the results returned did not match the users needs.

Implementation data processor 240 provides the capability to create implementation data capsules 800 and extract objects contained within the capsules. Implementation data processor 240 interacts with data storage device 260 and the databases contained within it. For example, an end user locates the implementation data they want to include in an implementation data capsule after utilizing analysis processor 235. The end user requests implementation data processor 240 to create an implementation data capsule including the selected objects. Implementation data processor 240 extracts the objects from implementation objects database 275 and meta-information from the implementation database 280 and creates an implementation data capsule 800. Implementation data capsule 800 is then compressed to save space and aid in efficient transporting between nodes.

Implementation data processor 240 also performs the reverse operation as described above. In this case, the objects contained in implementation data capsule 800 are examined by uncompressing and opening implementation data capsule. Implementation data processor 240 extracts the objects from implementation data capsule 800 whereby they are either updated or added to implementation objects database 275 and implementation database 280.

When an end user requests to create implementation data capsule 800, implementation management system 600 uses the results from the analysis processor 235 to extract the correct implementation objects from implementation objects database 275 and implementation database 280. The implementation management system 600 collects the objects associated with the implementation key and the end user criteria and adds them to implementation data capsule 800. Based on the objects selected, control files 825 are created and added to implementation data capsule 800. Control files 825 contain information which indexes the contents of implementation data capsule 800 and is used when control unit 200 and implementation management system 600 open implementation data capsule 800. If they exist and the user selects to include them in implementation data capsule 800, implementation deliverables associated with the implementation objects, are stored in implementation deliverables storage 830. The compression algorithm employed to reduce the size of implementation data capsule 800 may be supported by commercially available software such as Dynazip-AX manufactured by Inner Media, Inc.

The transfer and exchange of payments, charges, or debits, attendant to the method of the apparatus are supported by the billing processor 245. Processing of credit card transactions by this processor may be supported with commercially available software such as Open Market Transact manufactured by Open Market, Inc. The billing processor 245 provides commerce functions that may include online account statements, order-taking and credit card payment authorization, credit card settlement, automated sales tax calculations, digital receipt generation, account-based purchase tracking, and payment aggregation for low priced services.

Pricing processor 250 calculates the price for an implementation data capsule 800. This price maybe determined by a number of factors which may include the implementation objects, stored in implementation objects database 275, the end user wishes to include in the IDC. The end user does not have to accept the price for the IDC and can remove some of the implementation objects included in the IDC. Pricing processor 250 will then re-calculate the price for the IDC based on the new configuration of the IDC. In another embodiment pricing may be determined or influenced based upon a "fixed price" or a "subscription" arrangement with the end user.

Data storage device 260 may include hard disk magnetic or optical storage units, as well as CD-ROM drives or flash memory. Data storage device 260 contains databases used in the processing of transactions in the present invention, including admin database 265, end user database 270, implementation objects database 275, implementation database 280, billing database 285, audit database 290, and IDC storage 295. In a preferred embodiment database software such as SQL Server, manufactured by Microsoft Corporation, is used to create and manage these databases.

Admin database 265 maintains information on the administrators which may include name, company, address, phone number, ID number, passwords, active role in the projects, email addresses, voice mail addresses, and security access levels. Security access levels comprise the amount of control the administrator has over examining and updating information contained in the databases on the data storage device 260.

End user database 270 maintains data on end userswhich may include name, company, address, phone number, ID number, passwords, email address, active role in the projects, billing preferences, past system usage, etc. End users can determine the amount of information they want to share with other users. End users are able to contact other users based on the information provided.

Implementation objects database 275 maintains an inventory of implementation objects. End users collect implementation data with respect to the technology systems they are implementing. The implementation data is input into the database and organized into logical groupings based on the method of the apparatus. Some examples of the implementation objects are names of stakeholders and implementation team members, characteristics describing technology system being implemented, organizational areas where the technology system is to be used, and various sub-projects associated with the implementation.

Implementation database 280 maintains an index of all implementations represented in control unit 200. This database is indexed by the implementation key which is unique across all implementations.

Billing database 285 tracks commercial transactions, as well as billing preferences. This database is valuable in the event of complaints by end users regarding billing and payment discrepancies.

Audit database 290 records transactional information about all requests initiated between each node which can be retrieved for later analysis. This database may also log transaction traffic rates, login/logout attempts, and success/failure status of transactions.

Implementation data capsule (IDC) storage 295 acts as a storage area for implementation data capsules 800. In one embodiment IDC storage 295 represents a hierarchical file system on control unit 200.

Network interface 230 is the gateway to communicate with end users and administrators through respective end user interface 400 and administration interface 500. Conventional internal or external modems or wireless network connection devices may serve as network interface 230. Network interface 230 supports a various range of baud rates from 1200 upward, but may also be combined into such inputs as a T1 or T3 line if more bandwidth is required. In a preferred embodiment, network interface 230 is connected with the Internet to allow for the largest audience of end users to have access to the control unit 200. Along similar lines, network interface 230 may also be connected to a private Intranet or other network to allow end users within a particular organization to access the control unit 200.

Figure 3:
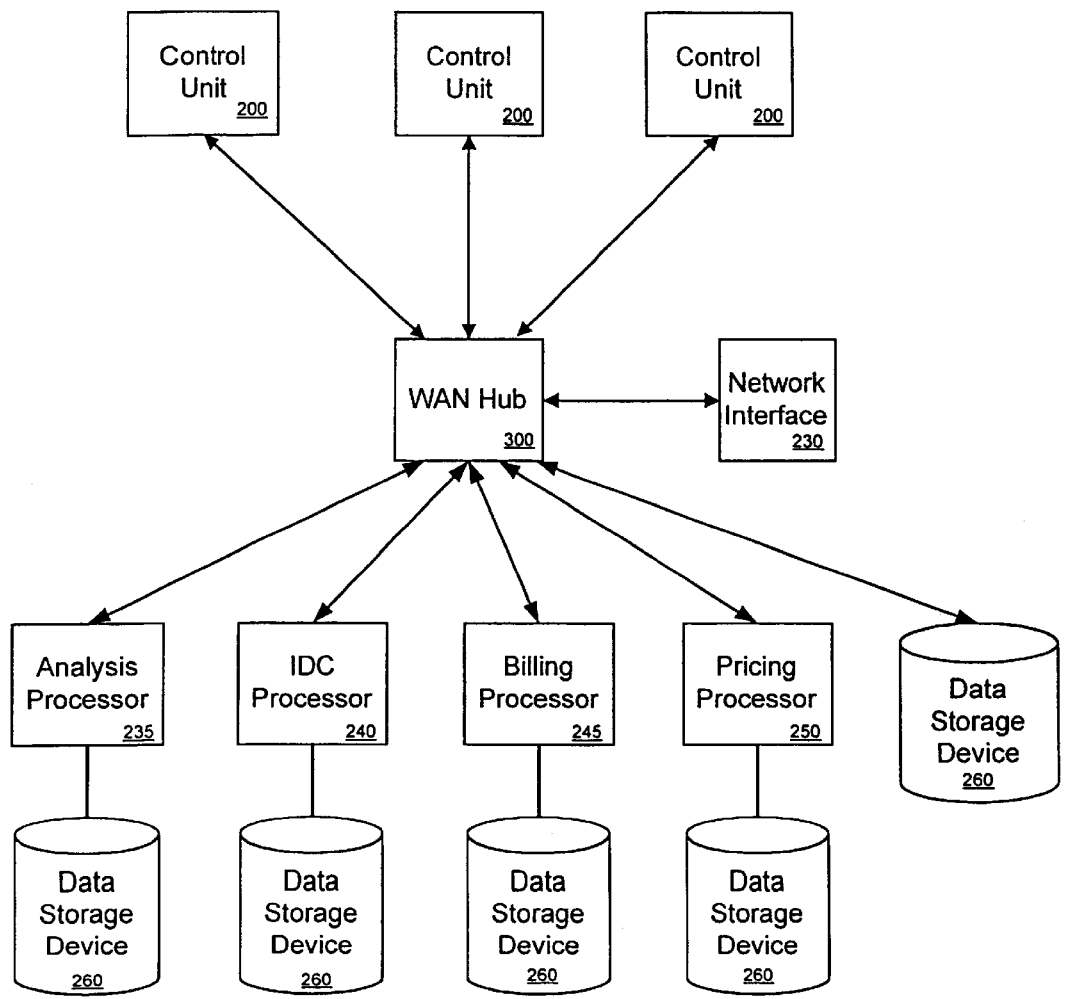
FIG. 3 illustrates an embodiment in which the computing resources of the Control Unit are distributed over a number of servers.

While the above embodiment describes a single computer acting as the control unit, those skilled in the art will realize that the functionality can be distributed over a plurality of computers. In another embodiment, control unit 200 may be configured in a distributed architecture, as shown in FIG. 3, wherein the databases and processors are housed in separate units or locations. Control unit(s) 200 perform the primary processing functions and contain at a minimum RAM, ROM, and a general processor. Each of these control units is attached to WAN hub 300 which acts as the primary communications link with the other processors. WAN hub 300 itself may contain minimal processing capability with its primary function of acting as a passive device facilitating communications and routing. Although only three control units are shown in this embodiment, those skilled in the art will appreciate that an almost unlimited number of control units may be supported. In such a configuration, each control unit is in communication with its processors as well as other control units. Analysis processor 235, IDC processor 240, billing processor 245, and pricing processor 250 all communicate through WAN hub 300 with control units 200. Data storage device 260 is available to each control unit and processor through WAN hub 300. This arrangement makes for a highly flexible and dynamic system, less prone to catastrophic hardware failures and bottlenecks. Those skilled in the art will also realize that the processors may also be combined and/or distributed over a plurality of computers. In addition those skilled in the art will recognize that the database entities contained in the data storage device 260 may also be distributed and/or implemented as entities of one database or multiple databases.

Figure 4:
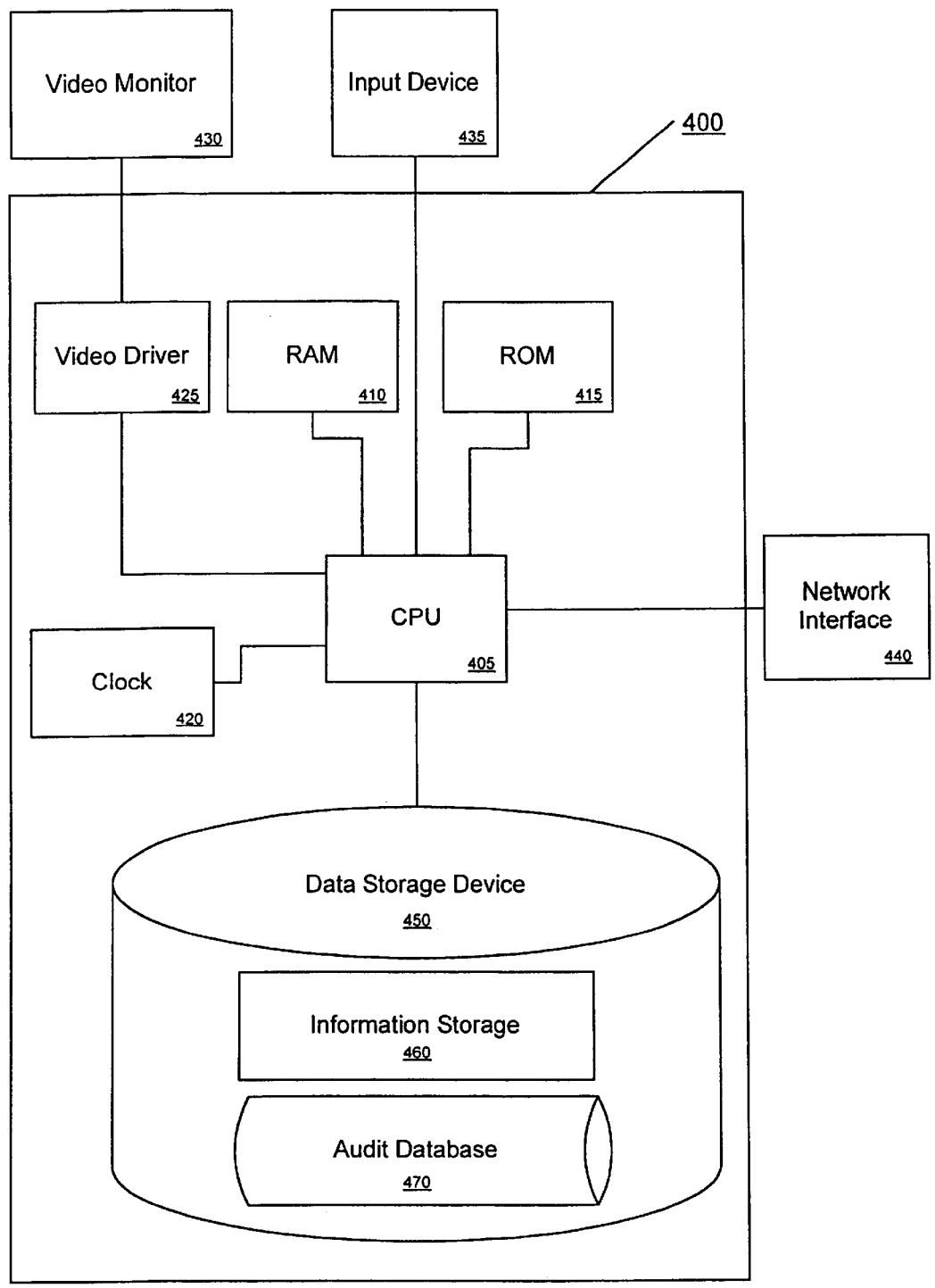
FIG. 4 is a block diagram showing an exemplary End-User interface.
Figure 5:
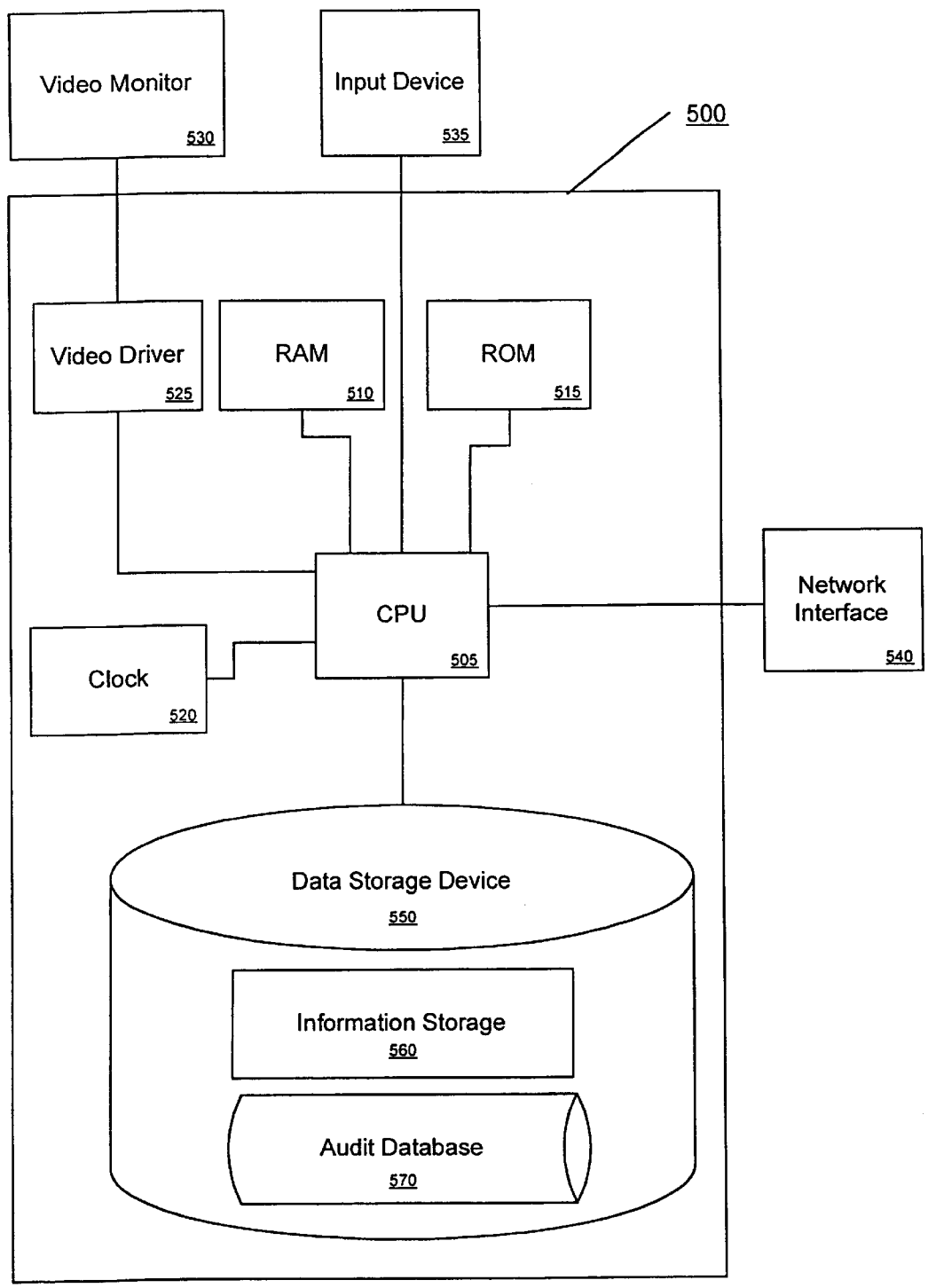
FIG. 5 is a block diagram showing an exemplary Administrator interface.

FIGS. 4 and 5 describe end user interface 400 and administrator interface 500 respectively. In an exemplary embodiment they are both conventional personal computers having an input device, such as a keyboard and mouse, or conventional voice recognition software package; a display device, such as a video monitor; a processing device such as a CPU; and a network interface such as a modem or high speed network connection.

Referring now to FIG. 4, there is described a preferred embodiment of an end user interface 400 which includes central processor (CPU) 405, RAM 410, ROM 415, clock 420, video driver 425, video monitor 430, input device 435, network interface 440, and data storage device 450.

A Pentium processor such as the 400 MHz Pentium III described above may be used for the CPU 405. Clock 420 is a standard chip-based clock which can serve to timestamp control unit transactions 120 and implementation management system transactions 130. Network interface 440 is the gateway between end user interface 400 and a network such as the Internet. In a preferred embodiment, users interact with control unit 200 using end user interface 400 and administrator interface 500 through a Web Browser such as Internet Explorer manufactured by Microsoft Corporation or Netscape Communicator manufactured by Netscape Corporation.

Data storage device 450 is a conventional magnetic based hard disk storage unit. Information storage 460 may be used to store implementation data capsules 800 and other information while audit database 470 may be used for recording communications with the control unit 200 and implementation management system 600 as well as payment records. In one embodiment information storage 460 represents a hierarchical file system on end user interface 400.

Referring now to FIG. 5, there is described a preferred embodiment of the administrator interface 500 which includes central processor (CPU) 505, RAM 510, ROM 515, clock 520, video driver 525, video monitor 530, input device 535, network interface 540, and data storage device 550. Clock 520 is a standard chip-based clock which can serve to timestamp control unit administration transactions 150 and implementation management system administration transactions 140.All of these components including data storage device 550, information storage 560, and audit database 570 may be identical to those described in FIG. 4.

End user interface 400 and administrator interface 500 interact with implementation management system 600 using custom built applications programs appropriate to the respective operating system of the interface. Those skilled in the art will appreciate that any number of commercially available programming environments, plug-ins, executables, DLL's, applets or objects can be employed to design and build the applications programs. In addition those skilled in the art will appreciate that the end user interface 400 and the administrator interface 500 can utilize any number of commercially available operating systems such as Unix, Linux, Windows and Windows NT, Macintosh, Windows CE or Palm OS.

Figure 6:
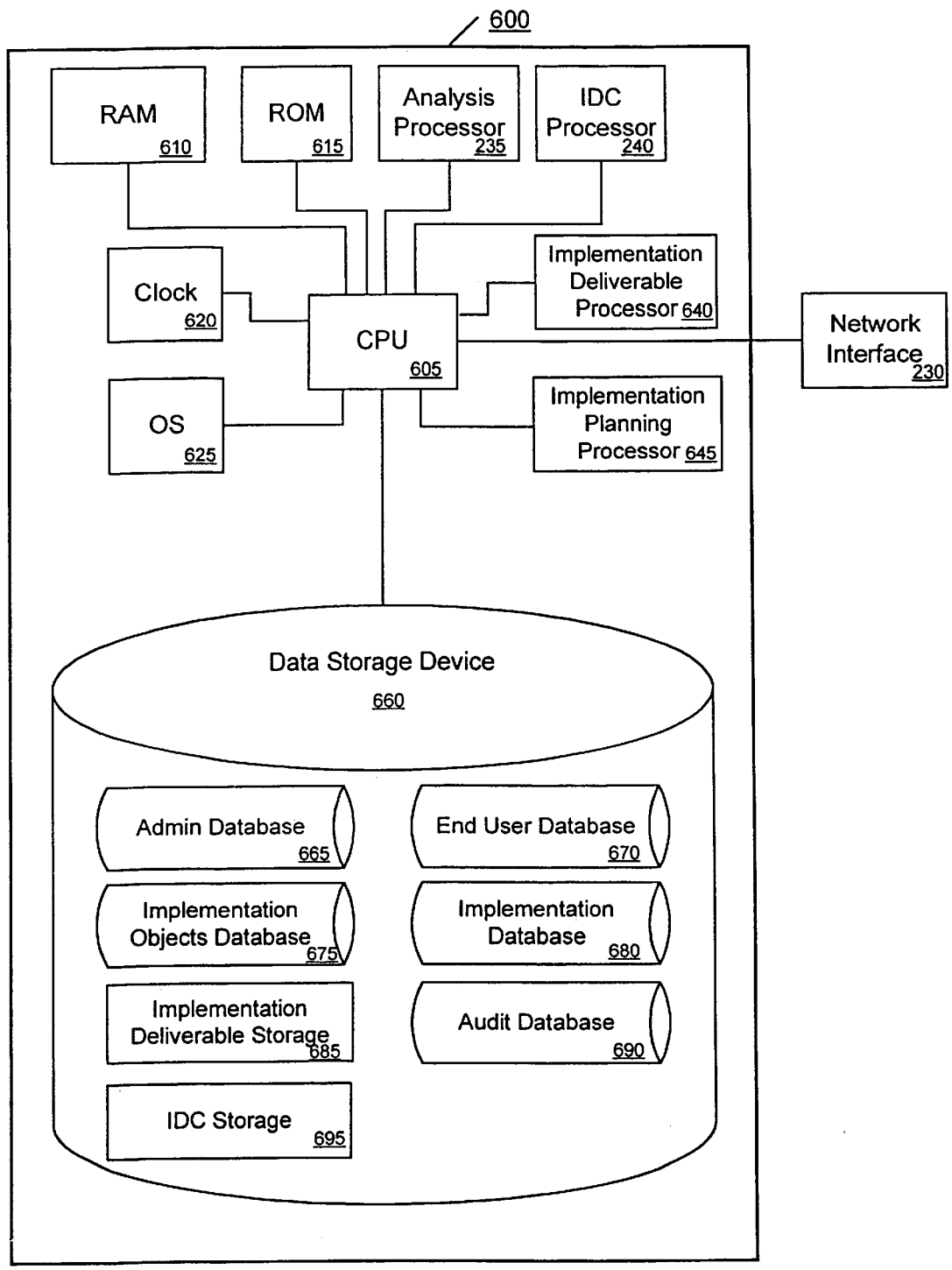
FIG. 6 is a block diagram showing one embodiment of the Implementation Management System.

Referring to FIG. 6, the implementation management system 600 is described as comprising a central processor (CPU) 605, RAM 610, ROM 615, clock 620, Operating System 625, network interface 630, analysis processor 235, implementation data capsule (IDC) processor 240, implementation deliverable processor 640, implementation planning processor 645, and data storage device 660.

A conventional personal computer, computer workstation or hand held, wireless personal digital assistant (PDA) with sufficient memory and processing capability may be used as implementation management system 600. End users and administrators use their respective applications program to access implementation management system 600. The implementation management system serves a different purpose than control unit 200 in the apparatus and method of the invention. It is a system used to collect and manage implementation data. It has the capability to share that implementation data with control unit 200. Control unit 200 also has the capability to share information with implementation management system 600. Those skilled in the art will appreciate that the implementation management system 600 may employ either the same or separate physical hardware as control unit 200 and that software components of the implementation management system 600 may either share code with or be entirely separate from the software components of control unit 200. In addition those skilled in the art will appreciate that the databases and processors associated utilized by the implementation management system 600 and the control unit 200 may overlap or be consolidated in another embodiment of the invention.

Referring again to FIG. 6, analysis processor 235, IDC processor 240, implementation deliverable processor 640, and implementation planning processor 645 comprise software subsystems that provide specialized functions for implementation management system 600. These subsystems are invoked appropriately as determined by the transactions requested from implementation management system 600.

Analysis processor 235 performs in the same way and includes the same capabilities as described above for control unit 200.

Implementation management system 600 utilizes IDC processor 240 in the same manner as control unit 200.

Implementation deliverable processor 640 is used to create various documents and output files based on the information stored in data storage device 660. This processor may be supported by commercially available software such as Office 2000 and Microsoft Project 98 manufactured by Microsoft Corporation. In one embodiment, implementation management system 600 utilizes the instantiated objects in Office 2000 and Microsoft Project 98 to create Microsoft Word documents and Microsoft Project schedules. The data used to generate these documents is taken from implementation objects database 675 and implementation database 680.

Implementation planning processor 645 creates an implementation plan using a proprietary and unique implementation planning method and process. The method and process first divides the implementation project into incremental sub-projects based upon the features and functions of the technology system that will be implemented and the locations and environments where the technology system will be implemented. The method and process then generates ratings for sub-projects depending upon numerical or other measures of the technical complexities, risk, priority, visibility, cultural complexities and resource complexities of each sub-project. Ratings may be provided by the end user or may be calculated automatically by the implementation planning processor 645. Those skilled in the art will recognize that a large number of techniques may be used to automatically generate ratings, such as generating ratings using a weighted average of all characteristics of a sub-project or generating ratings using a weighting of some subset of all characteristics of a sub-project. Based upon the ratings associated with each sub-project the implementation planning processor creates an implementation plan that provides a preferred ordering and strategy for completing the sub-projects. As new relevant data is provided to the implementation management system 600 (such as additional features and functions of the technology system, environmental data or updates to ratings) the implementation processor automatically re-creates a revised implementation plan.

Data storage device 660 may include hard disk magnetic or optical storage units, as well as CD-ROM drives or flash memory. Data storage device 660 contains databases used in the processing of transactions in the present invention, including admin database 665, end user database 670, implementation objects database 675, implementation database 680, implementation deliverable storage 685, audit database 690, and IDC storage 695. In a preferred embodiment database software such as Microsoft Access or SQL Server, both manufactured by Microsoft Corporation, is used to create and manage these databases.

Admin database 665 maintains information on the administrators which may include name, company, address, phone number, ID number, passwords, active role in the projects, email addresses, voice mail addresses, and security access levels. Security access levels comprise the amount of control the administrator has over examining and updating information contained in the databases on the data storage device 660.

End user database 670 maintains data on end users, which may include name, company, address, phone number, ID number, passwords, email address, active role in the projects, billing preferences, past system usage, etc.

Implementation objects database 675 maintains an inventory of implementation objects. End users collect implementation data with respect to the technology systems they are implementing. The implementation data input into the database are organized into logical groupings based on the method of the apparatus. Some examples of the implementation objects are names of stakeholders and implementation team members, characteristics describing the technology system being implemented, organizational areas where the technology system is to be used, and various sub-projects associated with the implementation.

Implementation database 680 maintains an index of all implementations represented in implementation management system 600. This database is indexed by the implementation key which is unique across all implementations.

Implementation delivery storage 685 stores output generated by the implementation deliverable processor 640. In one embodiment implementation delivery storage represents a hierarchical file system on implementation management system 600.

Audit database 690 stores transactional information about past communications which can be retrieved for later analysis. This database may also logs transaction traffic rates, login/logout attempts, and success/failure status of transactions.

Implementation data capsule (IDC) storage 695 acts as a storage area for implementation data capsules 800. In one embodiment IDC storage 695 represents a hierarchical file system on implementation management system 600.

Network interface 230 is utilized in the same way as described above with reference to FIG. 2.

Figure 7:
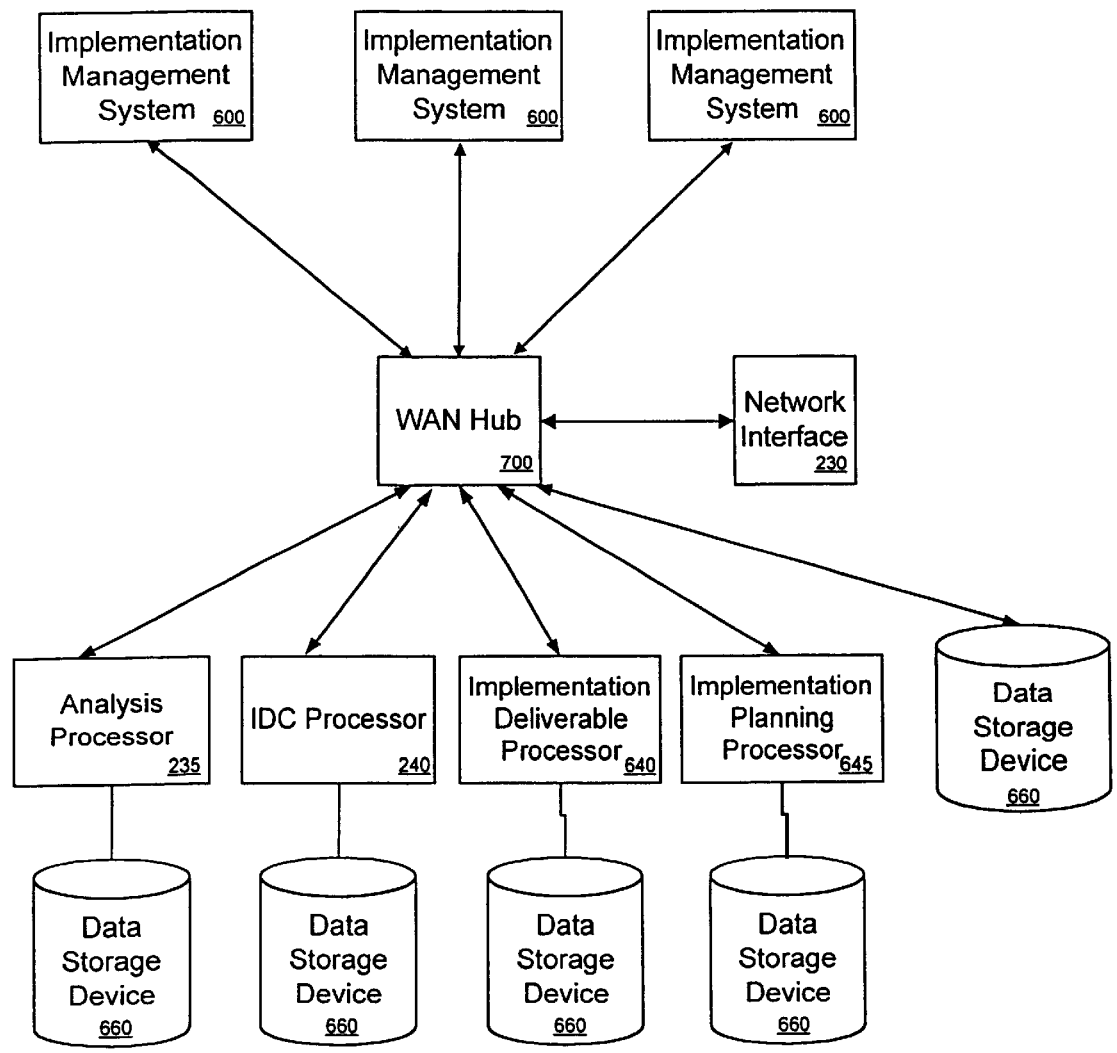
FIG. 7 illustrates an embodiment in which the computing resources of the Implementation Management System are distributed over a number of servers.

While the above embodiment describes a single computer acting as the implementation management system, those skilled in the art will realize that the functionality can be distributed over a plurality of computers. In another embodiment, implementation management system 600 may be configured in a distributed architecture, as shown in FIG. 7, wherein the databases and processors are housed in separate units or locations. Implementation management systems 600 perform the primary processing functions and contain at a minimum RAM, ROM, and a general processor. Each of these implementation management systems is attached to WAN hub 700 which acts as the primary communications link with the other processors. WAN hub 700 itself may contain minimal processing capability with its primary function of acting as a passive device facilitating communications and routing. Although only three implementation management systems are shown in this embodiment, those skilled in the art will appreciate that an almost unlimited number of implementation management systems may be supported. In such a configuration, each implementation management system is in communication with its processors as well as other implementation management systems. Analysis processor 235, IDC processor 240, implementation deliverable processor 640, and implementation planning processor 645 all communicate through WAN hub 700 with implementation management systems 600. Data storage device 660 is available to each implementation management system and processor through WAN hub 700. This arrangement makes for a highly flexible and dynamic system, less prone to catastrophic hardware failures and bottlenecks. . Those skilled in the art will also realize that the processors may also be combined and/or distributed over a plurality of computers. In addition those skilled in the art will recognize that the database entities contained in the data storage device 660 may also be distributed and/or implemented as entities of one database or multiple databases.

Figure 8:
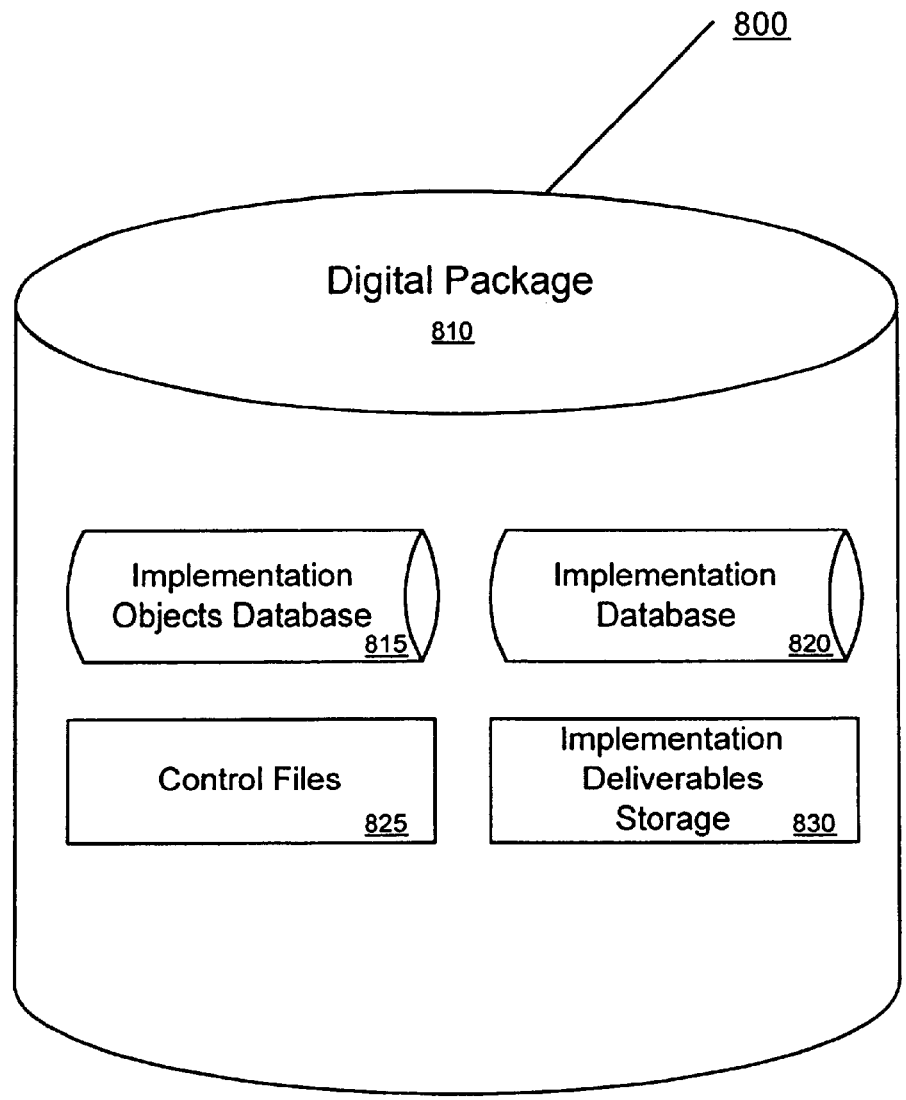
FIG. 8 is a block diagram showing one embodiment of the Implementation Data Capsule.

Referring to FIG. 8, there is described a preferred embodiment of implementation data capsule 800, which includes digital package 810, implementation objects database 815, implementation database 820, control files 825, and implementation deliverables storage 830. Implementation objects database 815, implementation database 820, and implementation deliverables storage 830 represent a subset of all implementation objects and implementation data available in control unit 200 and implementation management system 600. Control files 825 act as an index and inventory of the implementation objects and data contained in digital package 810. IDC processor 240 utilizes control files 825 to update implementation objects database 275 and 675 and implementation database 280 and 680 and implementation deliverables storage 695.

Digital package 810 acts as a container for the implementation objects and databases. Those skilled in the art will realize that digital package 810 can be gathered together with other digital packages and each reside in a single implementation data capsule 800. In this embodiment, implementation data capsule 800 is used to transport multiple digital packages using a single control unit transaction 120 or implementation management system transaction 130.

Two exemplary embodiments describe the versatility in using implementation data capsule 800. In one embodiment, an end user wishes to take a "snapshot" of a technology system implementation which includes all implementation data, tools and strategies that have been entered to date. The end user then wishes to transfer the snapshot to their technology system vendor for review and expert advice. This is accomplished by requesting IDC processor 240 to create an implementation data capsule 800 and transfer it to control unit 200. The vendor then submits a control unit transaction 120 to access and transfer the end users implementation data capsule for review.

In another embodiment, an end user is beginning the process of implementing a technology system. The end user has identified a set of implementation objects that can be used as a template and staring point for their implementation. The end user creates an implementation data capsule 800 which contains the implementation objects and transfers the implementation data capsule from control unit 200 to implementation management system 600 The end user utilizes IDC processor 240 in implementation management system 600 to create their working implementation environment using implementation data capsule 800 as a template.

Transaction Overview

The End User initiates a series of IMS transactions 150 to the Implementation Management System 600 and Control Unit transactions 120 to the Control Unit 200. IMS transactions 150 will initiate transactions such as creating a new implementation, managing the implementation workflow, managing the implementation planning process and creating an Implementation Data Capsule 800. Control Unit transactions 120 will initiate transactions such as searching for and locating an IDC 800 to be used as an implementation template, creating a custom IDC, providing implementation analysis and handling commerce items.

Figure 9:
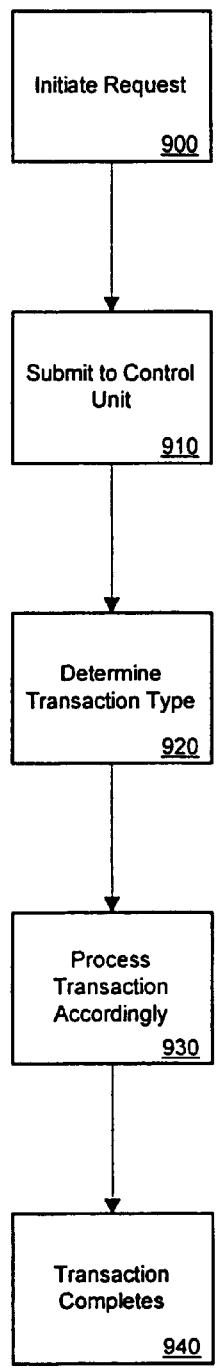
FIG. 9 illustrates an embodiment showing how a Control Unit Transaction is processed by the Control Unit.

With reference to FIG. 9, there is described a process by which the end user initiates and completes a control unit transaction 120. The end user creates a transaction request at step 900. A transaction request may contain a specific request and any necessary parameters and criteria. For example an end user may initiate a control unit request to create a new IDC which contains specific implementation objects. Multiple requests may be bundled into a single transaction. The transaction is submitted to the control unit 200 at step 910. At step 920 the control unit 200 then evaluates the request to determine the transaction type based upon the request, the parameters and criteria. An unlimited number of transaction types may be processed by the control unit and multiple transactions can be initiated and processed together. Common transaction types include analysis, IDC transfer, IDC creation, billing and payment. At step 930 the request is processed accordingly by the control unit 200 depending on the type of transaction requested. At step 940 the results of the control unit transaction 120 are returned to the end user completing the transaction.

Figure 10:
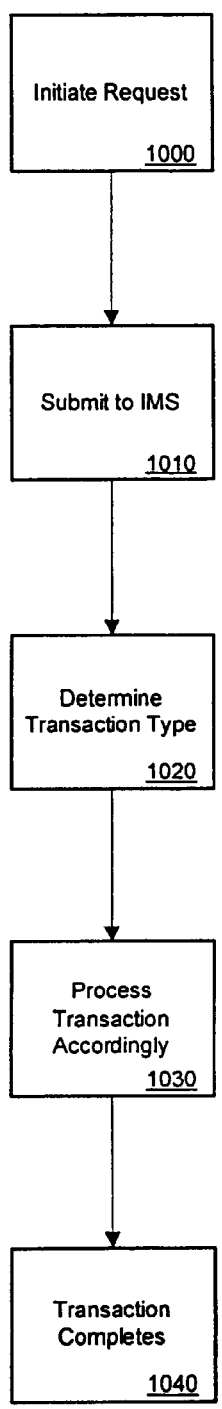
FIG. 10 illustrates an embodiment showing how an IMS Transaction is processed by the Implementation Management System.

With reference to FIG. 10, there is described a process by which the end user initiates and completes an IMS transaction 150. The end user creates a transaction request at step 1000. A transaction request may contain a specific request and any necessary parameters and criteria. For example an end user may initiate an IMS request to create a new implementation deliverable such as a project plan or schedule. Multiple requests may be bundled into a single transaction. The transaction is submitted to the IMS 600 at step 1010. At step 1020 the IMS 600 then evaluates the request to determine the transaction type based upon the request, the parameters and criteria. An unlimited number of transaction types may be processed by the IMS and multiple transactions can be initiated and processed together. Common transaction types include implementation data input, implementation planning, deliverable creation, IDC creation, implementation setup and implementation data management. At step 1030 the request is processed accordingly by the IMS 600 depending on the type of transaction requested. At step 1040 the results of the IMS transaction 150 are returned to the end user completing the transaction.

The administrator initiates a series of IMS administration transactions 140 to the Implementation Management System 600 and Control Unit administration transactions 150 to the Control Unit 200. IMS administration transactions 140 will initiate transactions such as creating a new implementation, managing the implementation workflow, managing the implementation planning process and creating an Implementation Data Capsule 800. Control Unit administration transactions 150 will initiate transactions such as searching for and locating an IDC 800 to be used as an implementation template, creating a custom IDC, providing implementation analysis and handling commerce items.

Figure 11:
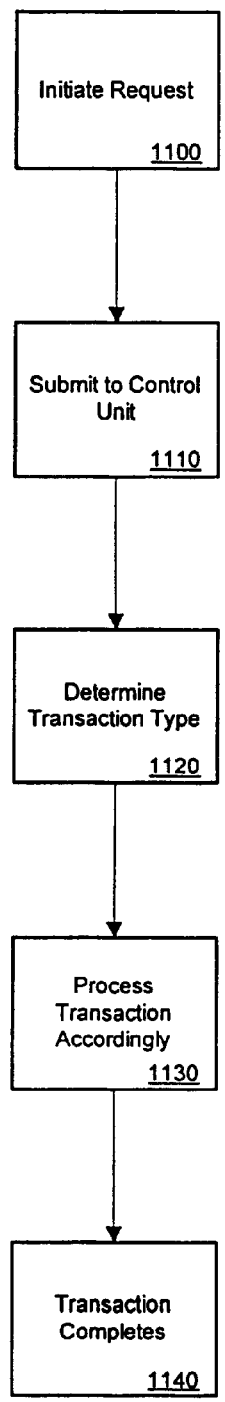
FIG. 11 illustrates an embodiment showing how a Control Unit Administration Transaction is processed by the Control Unit.

With reference to FIG. 11, there a described the process by which the administrator initiates and completes a control unit administration transaction 150. The administrator creates an administration transaction request at step 1100. A transaction request may contain a specific request and any necessary parameters and criteria. For example an administrator may initiate a control unit administration request to release an IDC to the end user community. Multiple requests may be bundled into a single transaction. The transaction is submitted to the Control Unit 200 at step 1110. At step 1120 the Control Unit 200 then evaluates the request to determine the transaction type based upon the request, the parameters and criteria. An unlimited number of transaction types may be processed by the Control Unit and multiple transactions can be initiated and processed together. Common transaction types include reviewing and releasing an IDC to an end user and general maintenance of the control unit environment. At step 1130 the request is processed accordingly by the control unit 200 depending on the type of transaction requested. At step 1140 the results of the control unit administration transaction 150 are returned to the administrator completing the transaction.

Figure 12:
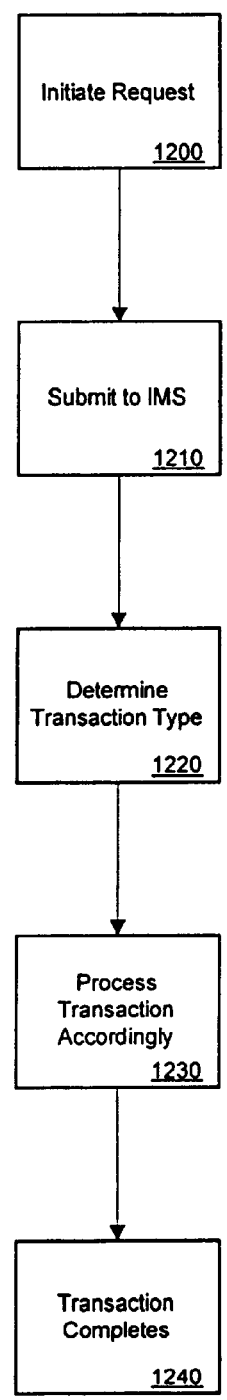
FIG. 12 illustrates an embodiment showing how an IMS Administration Transaction is processed by the Implementation Management System.

With reference to FIG. 12, there is described a process by which the administrator initiates and completes an IMS administration transaction 140. The administrator creates a transaction request at step 1200. A transaction request may contain a specific request and any necessary parameters and criteria. For example an administrator may initiate an IMS administration request add a new authorized user to the IMS. Multiple requests may be bundled into a single transaction. The transaction is submitted to the IMS 600 at step 1210. At step 1220 the IMS 600 then evaluates the request to determine the transaction type based upon the request, the parameters and criteria. An unlimited number of transaction types may be processed by the IMS and multiple transactions can be initiated and processed together. Common transaction types would include setup of the IMS environment and maintenance of the IMS environment. At step 1230 the request is processed accordingly by the IMS 600 depending on the type of transaction requested. At step 1240 the results of the IMS transaction 140 are returned to the administrator completing the transaction.

Implementation Management Embodiment

In one embodiment the present invention is used by the end user to facilitate, manage and support the implementation of a technology system through a series of transactions with the IMS 600 and control unit 200.

1. The end user creates one or more Implementation Data Capsules which will act as "implementation templates" through a combination of IMS transactions 130 and control unit transactions 120 (FIG. 13).
2. The end user then initiates an IMS transaction 130 for starting a new implementation (based upon the appropriate implementation template) and registers the implementation with the control unit 200. (FIG. 14)
3. The end user then initiates a series of IMS transactions 130 for inputting implementation data into the IMS 600. (FIG. 15)
4. The end user then initiates a series of IMS transactions 130 to the implementation planning facility with the goal of creating an implementation plan and strategy. (FIG. 16)
5. The end user then initiates an IMS transaction 130 to create an IDC 800 that contains implementation data and planning information. (FIG. 17)
6. The end user then initiates control unit transactions 120 that transfer the IDC 800 to the control unit 200. (FIG. 18)
7. The end user then initiates control unit transactions 120 that will analyze the IDC 800 for issues or problems that will impact the end user's implementation. (FIG. 19)
8. The end user then initiates a series of IMS transactions 130 for creating implementation deliverables such as implementation schedules, reports and project plans. (FIG. 20)
9. The end user then continues with the implementation process and continues to initiate IMS transactions 130 to update and manage the data and information associated with the implementation. (FIG. 15)
10. When the implementation process is complete the end user initiates an IMS transaction 130 to create an updated IDC 800. (FIG. 17)
11. The end user then initiates a control unit transaction 120 to transfer the IDC 800 to the control unit 200. (FIG. 18)
12. The administrator then initiates a combination of IMS administration transactions 140 and control unit administration transactions 150 to release and make available the IDC and the contents of the IDC to other end users. (FIG. 13)

Figure 13:
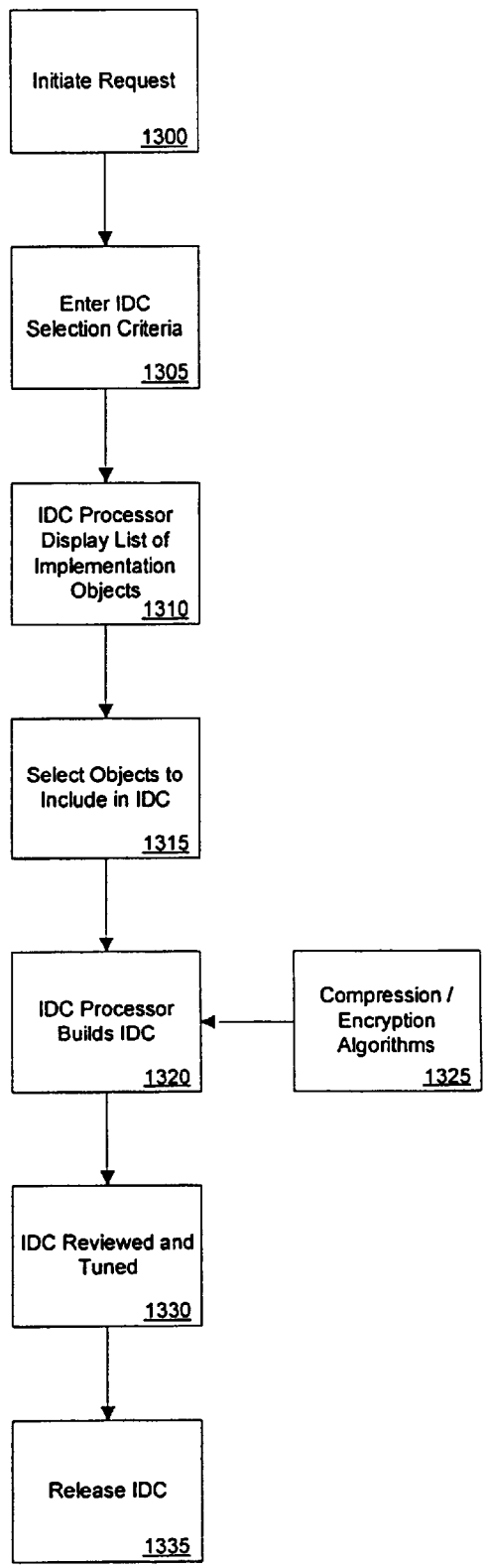
FIG. 13 illustrates an embodiment showing how a template Implementation Data Capsule is created by the administrator.

FIG. 13 describes the process of creating an IDC that can be used as an "implementation template" by the IMS. At step 1300 the administrator initiates a request to create a new IDC. At step 1305 the administrator enters specific criteria which will be used to locate implementation objects that will be used as the basis for the new IDC. For example the administrator may specify criteria surrounding the implementation of Microsoft Excel in the Apple Macintosh environment. At step 1310 the IDC processor returns a list of implementation objects matching the criteria based upon data within the implementation objects database The administrator selects specific objects from this list at step 1320 to be included in the new IDC and the IDC processor builds the new IDC at step 1325 and adds to the IDC to the IDC storage area within the Control Unit. In another embodiment the process of selecting specific implementation objects is bypassed and the IDC processor automatically builds the IDC based upon the criteria provided at step 1305 without specific criteria selected. Optionally various commercially available compression and encryption algorithms 1330 may be employed during the building of the IDC. At step 1335 the new IDC is reviewed and tuned by the administrator using the IMS. At step 1340 the administrator releases the new IDC so that it can be accessed and utilized by end users.

Figure 14:
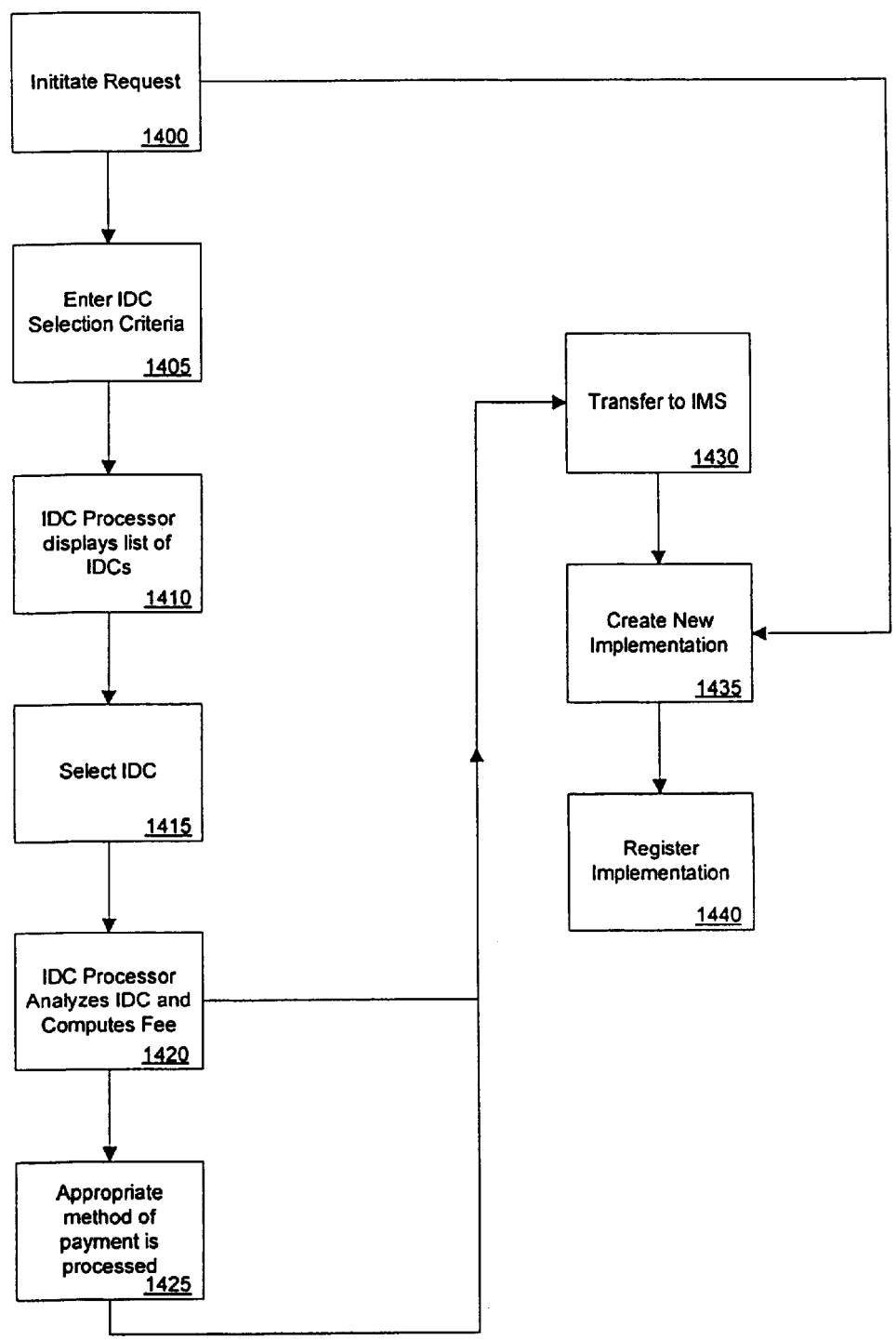
FIG. 14 illustrates an embodiment showing how a new implementation is created and registered by the Implementation Management System.

FIG. 14 describes the process of an end user creating a new implementation within the IMS based upon an "implementation template" IDC and registering the implementation with the control unit. At step 1400 the end user initiates a request to create a new implementation. An implementation refers to the project of implementing a particular technology in a specific area within the end user's organization. At step 1405 the end user provides selection criteria to the IDC to locate a list of IDC's that could be used as a template for the new implementation. At step 1410 a list of IDC which match the criteria specified is provided and at step 1415 the end user selects the IDC which will be used as template for the new implementation. At step 1420 the IDC processor analyzes the IDC selected and computes any fees or charges that will need to be paid to utilize the IDC as a template. If a fee is required the control unit handles and processes the payment at step 1425. At step 1430 the IDC is transferred to the IMS and a new implementation is created within the IMS at step 1435. In another embodiment the end user creates a new implementation without utilizing an IDC as a template. At step 1440 the end user registers the new implementation with the control unit completing the process.

Figure 15:
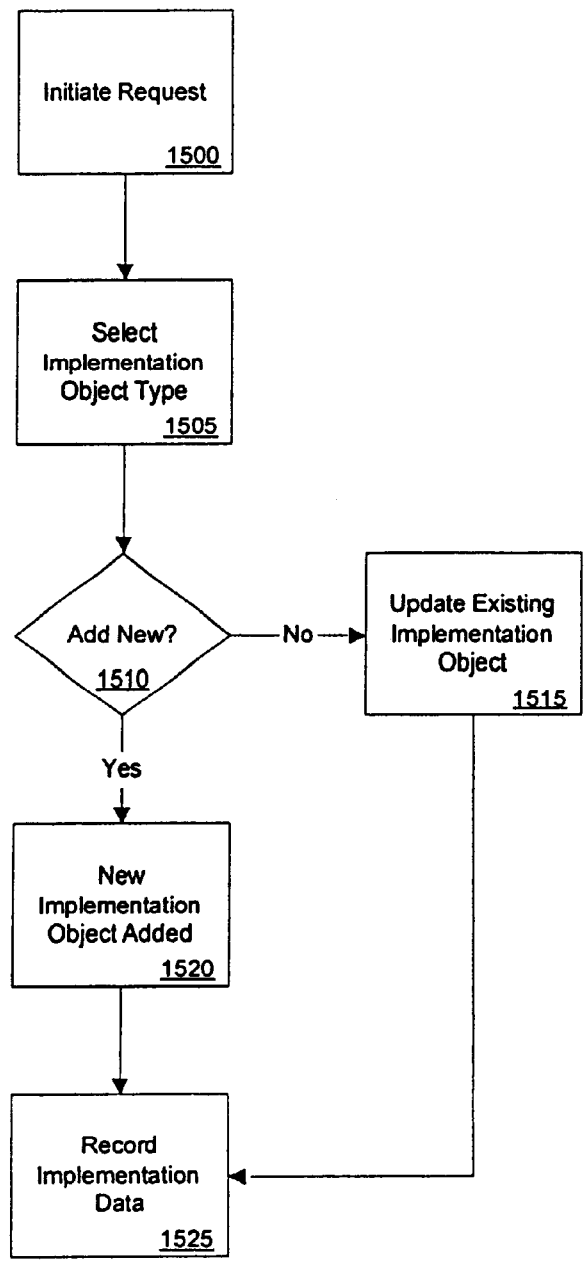
FIG. 15 illustrates an embodiment showing how implementation data is input and updated by the Implementation Management System.

FIG. 15 describes the process of an end user inputting and updating implementation information into the IMS. At step 1500 a data input request is initiated by the end user. At step 1505 the end user selects which implementation object type the implementation information will be associated with. For example the end user may be entering information about "stakeholders" in the IMS. In this case the end user would select the Stakeholder implementation object type. At step 1510 the end user determines whether a new implementation object will be added or an existing implementation object will be updated. At step 1515 an existing implementation object is updated while at step 1520 a new implementation object is added. At step 1525 all implementation information added or updated is recorded in the IMS.

Figure 16:
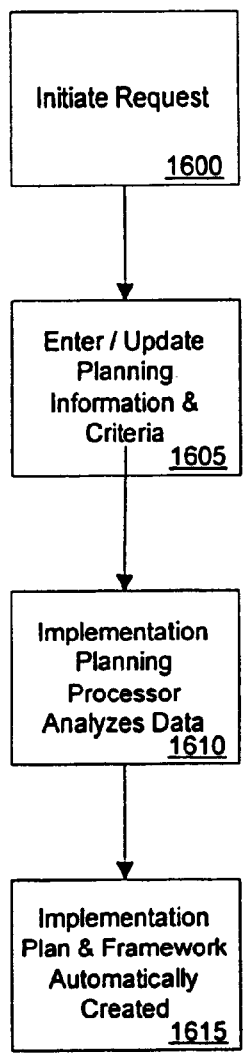
FIG. 16 illustrates an embodiment showing the Implementation Planning process by the Implementation Management System.

FIG. 16 describes the process of an end user using the IMS implementation planning facility to create an implementation plan and strategy. At step 1600 an implementation planning request is initiated by the end user. At step 1605 the end user enters or updates planning information and criteria. At step 1610 the IMS implementation planning processor analyzes the criteria and implementation data from the IMS. At step 1615 an implementation plan and framework is automatically created by the implementation planning processor.

Figure 17:
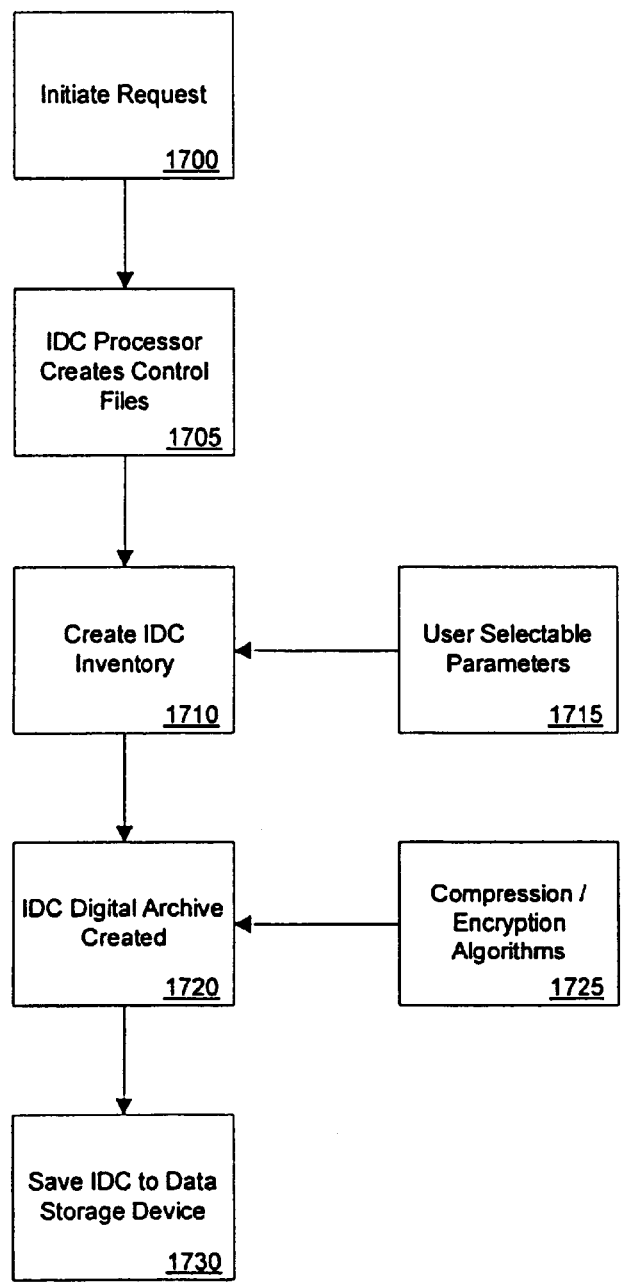
FIG. 17 illustrates an embodiment showing how an Implementation Data Capsule is created by the Implementation Management System.

FIG. 17 describes the process of completing a transaction related to the creation of an IDC. At step 1700 an IDC creation request is initiated by the end user. At step 1705 the process of creating an IDC commences by creating a control file. The control file contains information about the implementation and the IDC that will be utilized by the Control Unit. For example the control file could contain an index and keywords of all the items in the IDC. At step 1710 the IDC processor determines the inventory of all objects and information that will be included in the IDC. In one embodiment the end user may include all implementation objects and information in the IDC while in another embodiment the user may select which implementation objects will be included through selection parameters 1715. In step 1720 the IDC digital archive 810 is created which includes all selected implementation information and objects. In one embodiment the IDC can optionally be encrypted and compressed 1725 using commercially available compression and encryption utilities. At step 1730 the IDC is saved to the IMS storage device 697. Once this transaction is complete the IDC can be transferred to the control unit or other end users.

Figure 18:
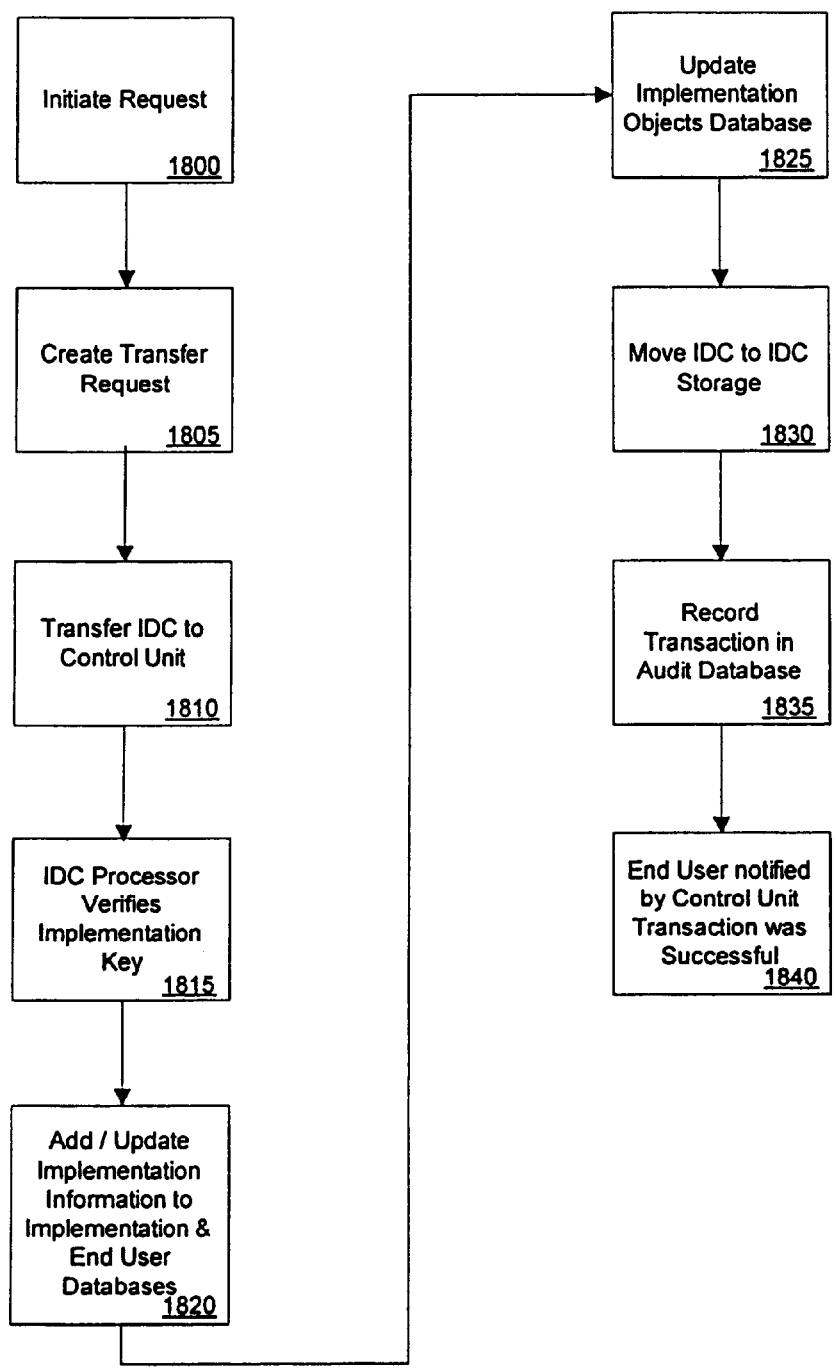
FIG. 18 illustrates an embodiment showing how an Implementation Data Capsule is transferred to the Control Unit.

FIG. 18 describes the process of completing a transaction related to the transfer of an IDC to the control unit. At step 1800 an IDC transfer is initiated by the end user. At step 1805 the transfer request is created which includes the specific IDC to be transferred and information related to the transfer such as end users name and contact information. At step 1810 the IDC transfer request is transferred to the control unit. At step 1815 the control unit verifies that the implementation associated with the IDC is registered with the control unit. The control unit at step 1820 then processes the IDC transfer request with implementation information added and updated to the implementation and end user databases. At step 1825 the implementation object database is updated. At step 1830 the IDC is moved to the IDC storage area in the control unit. At step 1835 the transaction is recorded in the audit database and the end user is notified that the transaction was successful 1840.

Figure 19:
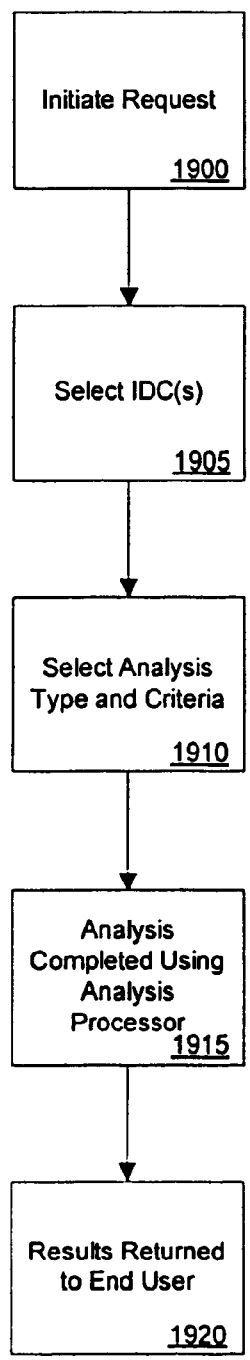
FIG. 19 illustrates an embodiment showing how the Control Unit analyzes an Implementation Data Capsule.

FIG. 19 describes the process of the control unit analyzing an IDC for issues or problems related to the implementation. For example an end user may want to know if the implementation plan and strategy that has been created is realistic based upon other similar implementations. In another embodiment the end user may want the implementation to be audited to ensure that the implementation data entered is accurate. At step 1900 a request to analyze an IDC is made to the control unit. At step 1905 the end user selects the IDC(s) that will be analyzed and in step 1910 specified the type of analysis that will be done. Based upon the type of analysis selected specific analysis criteria may be provided by the end user. At step 1915 the analysis is done using the analysis processor within the control unit. At step 1920 the results of the analysis are returned to the end user by the control unit.

Figure 20:
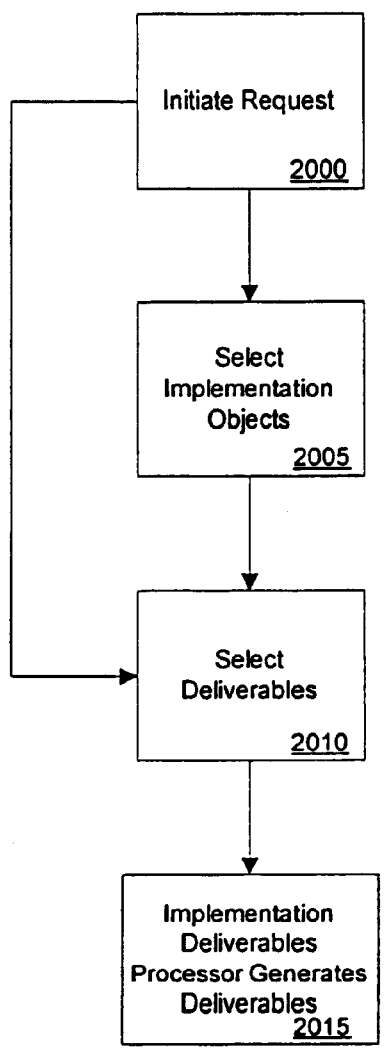
FIG. 20 illustrates an embodiment showing the creation and updating of implementation deliverables.

FIG. 20 describes the process of completing a transaction relating to the creation of implementation deliverables from the IMS. At step 2000 a request to create implementation deliverables such as a project schedule, plan or report is initiated by the end user. At step 2005 the end user optionally selects which implementation objects are to be included in the deliverable. For example the end user may decide only to include information about the implementation team in a report. At step 2010 the end user selects the deliverables to be created. Based upon this selection the implementation deliverables processor generates the requested deliverables in step 2015.

Implementation Data Exchange Embodiment

In one embodiment the present invention is used by the end user to facilitate the exchange of implementation data with another end user through a series of transactions with the IMS 600 and control unit 200. The purpose of this exchange is to enable other end users (such as a vendor, consultant or industry expert) to review and possibly update the end user's implementation data. When the review is complete the implementation data will be returned the end user.

1. The end user initiates an IMS transaction 150 to create an IDC 800 that contains implementation data (FIG. 17).
2. The end user then initiates control unit transactions 120 that transfers the IDC 800 to the control unit 200. Included in the transaction request is the identification(s) of the other end user(s) where the IDC should be routed. (FIG. 18)
3. The control unit 200 then routes the IDC 800 to the IMS 600 and notifies the appropriate end users.
4. The receiving end user initiates a series of IMS transactions 150 to review (and possibly update) the implementation data.
5. When the review is complete the receiving end user initiates an IMS transaction 150 to create an IDC 800 that contains implementation data (FIG. 17).
6. The receiving end user initiates control unit transactions 120 that transfers the IDC 800 to the control unit 200. (FIG. 18)
7. The control unit 200 then routes the IDC 800 to the IMS 600 and notifies the sending end user that the transaction is complete.

Billing Embodiment

Figure 21:
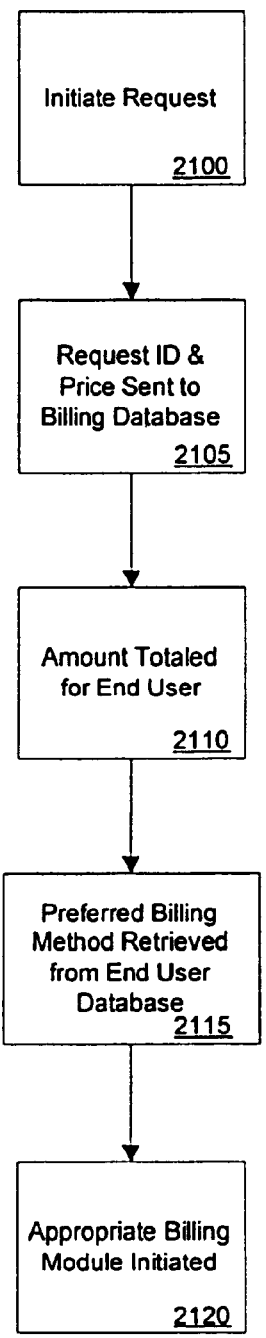
FIG. 21 illustrates an exemplary embodiment a billing system related to the present invention.

FIG. 21 describes an exemplary billing system of the present invention. End users may be billed and make payments for executing various control unit transactions 120 and IMS transactions 130 such as implementation analysis and review. In addition end users may be billed and make payments for the license and use of various IDC's 800 that are used as templates with the IMS 600. End user invoicing and payments are described using conventional credit card electronic charges, checks, Electronic Funds Transfer ("EFT"), or digital cash. These payment methods are meant to be merely illustrative, as there are many equivalent payment methods commonly known in the art which may be used.

The billing process is initiated at step 2100 when the end user initiates a control unit transaction 120 or IMS transaction 170 which is deemed to be billable. Once the billing process is started the price and tracking number of the control unit transaction 120 or the IMS transaction 170 is processed and sent to the billing database 290 at step 2105. At step 2110 there are a number of billing protocols that can be used. For example, one protocal, cash on delivery ("COD"), requires that the end user pay before completing a control unit transaction 120 or an IMS transaction 170. Another protocol is a credit system in which the end user pays at the end of the billing period.

At step 2115 the end users preferred billing method is retrieved from the control unit 120. In the COD protocol the billing processor 245 generates a bill prior to completing the control unit transaction 120 or the IMS transaction 170. In a credit protocol the billing processor 245 searches the billing database 290 at the end of each billing period and totals the amount owed by each end user. At step 2120 the appropriate billing module (credit card, EFT, check, electronic cash) is initiated.

Implementation Data Capsule Pricing Embodiment

Figure 22:
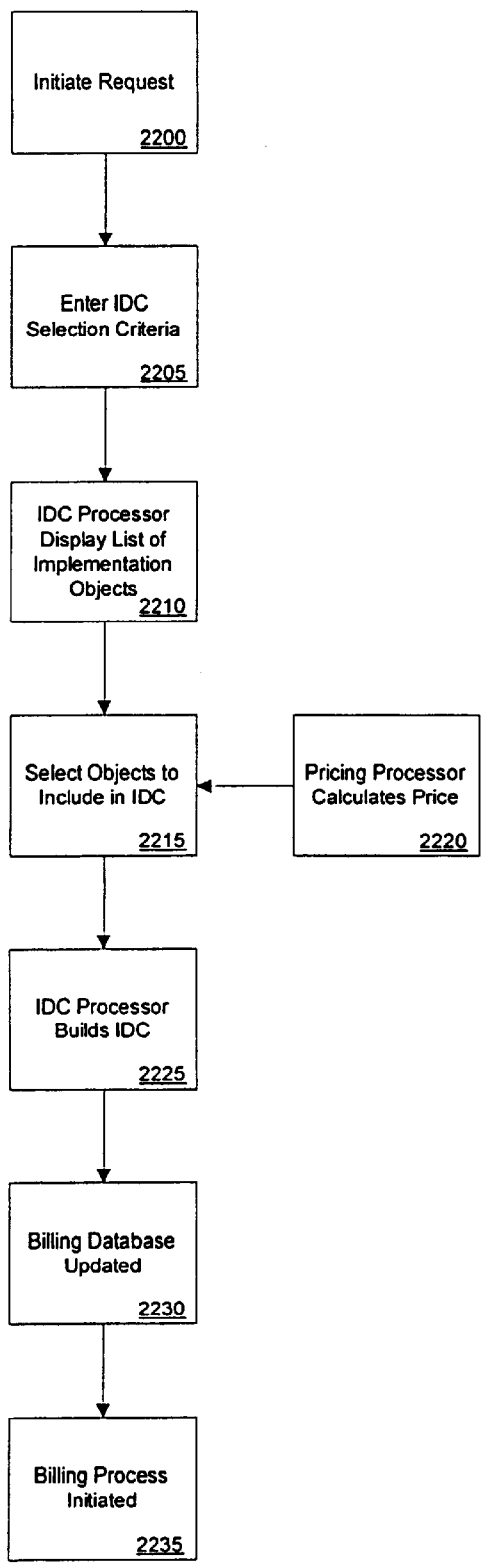
FIG. 22 illustrates an exemplary embodiment for automatically calculating the price of an Implementation Data Capsule price.

FIG. 22 describes an exemplary IDC pricing system of the present invention. End users may be billed and make payments for the license and use of various IDC's 800. The price of an IDC may be determined based upon the objects that are included in the IDC from the implementation object database 275 and the IDC's stored in IDC storage 297. The pricing method described is meant to be merely illustrative, as there are other many pricing methods which may be employed.

The IDC pricing process is initiated at step 2200 when the end user initiates a request to create an IDC. At step 2205 the end user enters criteria in order to identify potential implementation objects to be included in the IDC. At step 2210 the IDC processor 240 identifies a list of implementation objects which match the criteria provided in step 2205. At step 2215 the end user selects implementation objects to be included in the new IDC 800. As the user selects specific implementation objects the pricing processor 250 automatically calculates the price of the implementation object using data from the implementation object database 275 (see step 2220). A total price of all implementation objects selected is maintained throughout the selection process. The pricing processor 250 automatically calculates discounts and other pricing incentives as objects from the implementation object database 275 are selected.

At step 2225 the IDC processor builds the IDC based upon the implementation objects selected. At step 2230 the billing database is updated with the price of the IDC 800 and the billing process (as described in FIG. 21) is initiated at step 2235.

Implementation Marketplace and Community Embodiment

Another embodiment of the present invention revolves around the creation of an implementation marketplace and community. In one embodiment an end user develops an IDC 800 that could contain valuable implementation data, tools and strategies for a specific type of technology system implementation. The end user can transfer the IDC 800 to the control unit 200 and request that the IDC 800 may be made available to be sold or licensed to other end users. A number of pricing strategies could be selected by the end user such as a fixed price or a bid approach. Other end users could then access, review and purchase the IDC by initiating a series of control unit transactions 120 with the control unit 200.

In another embodiment end users could procure the services of an implementation expert or consultant of a specific type of technology system implementation using the present invention. Through a control unit transaction 120 end users can contact and establish a dialog with one or more experts for a specific technology system. Implementation Data Capsules 800 can be exchanged between the end user and the expert as described in the Implementation Data Exchange Embodiment.

In another embodiment an end user can establish dialogs with other end users that are involved in similar technology system implementations. Implementation Data Capsules 800 can be exchanged between the end users as described in the Implementation Data Exchange Embodiment.

We claim:

1. A system to enable the implementation and integration of technology systems comprising:

a) a control unit subsystem for coupling to a network and adapted to i) search for and analyze information, ii) create implementation data capsules, and extract objects from said implementation data capsules;

b) an implementation management subsystem for coupling to said network and adapted to i) collect and manage implementation data, ii) create an optimal implementation plan;

c) an end user interface subsystem for coupling to said network and adapted to i) receive end user requests for processing to be performed by said control unit subsystem and said implementation management subsystem, ii) pass said requests to said control unit subsystem and said implementation management subsystem through said network, and iii) receive results of said requests from said control unit subsystem and said implementation management subsystem;

d) an administration interface subsystem for coupling to said network and adapted to i) receive administrative user requests for processing to be performed by said control unit subsystem and said implementation management subsystem, ii) pass said requests to said control unit subsystem and said implementation management subsystem through said network, and iii) receive results of said requests from said control unit subsystem and said implementation management subsystem.

2. The system defined by claim 1 wherein said implementation data capsules are each a digital package which comprises:

a) an implementation objects database which stores implementation objects;

b) an implementation database which stores an index of implementations represented in said implementation management subsystem;

c) control files which store index information and an inventory for the implementation objects and data contained in said digital package; and d) implementation deliverables storage which store a subset of said implementation objects and implementation data available in said control unit subsystem and said implementation management subsystem.

3. The system defined by claim 1 wherein said control unit subsystem comprises:
   a) a network interface adapted to act as a gateway for coupling said control unit subsystem to said network;
   b) an analysis processor adapted to provide the capability to search for and analyze information in said data storage device and return the information to an end user or administrator;
   c) an implementation data capsule processor adapted to create said implementation data capsules and extract objects contained within the capsules;
   d) a pricing processor adapted to calculate a price for said implementation data capsules;
   e) a billing processor adapted to enable payments to be made for accessing said implementation data capsules;
   f) a data storage device for storing a set of databases utilized by said analysis, implementation, pricing and billing processors.

4. The system defined by claim 1 wherein said implementation management subsystem comprises:
   a) a network interface adapted to act as a gateway for coupling said implementation management subsystem to said network;
   b) an analysis processor adapted to provide the capability to search for and analyze information in said data storage device and return the information to an end user or administrator;
   c) an implementation data capsule processor adapted to create said implementation data capsules and extract objects contained within the capsules;
   d) an implementation deliverable processor adapted to create documents and output files based on information stored in said data storage device;
   e) an implementation planning processor adapted to create an optimal implementation plan using the objects stored in said data storage device;
   f) a data storage device for storing a set of databases utilized by said analysis processor, said implementation data capsule processor, said implementation deliverable processor, and said implementation planning processor.

5. The system defined by claim 1 wherein said end user interface subsystem comprises a personal computer or workstation including a network interface, browser software, information storage and an audit database.

6. The system defined by claim 1 wherein said administration interface subsystem comprises a personal computer or workstation including a network interface, browser software information storage and an audit database.

7. The system defined by claim 3 wherein said data storage device comprises an admin database, an end user database, an implementation objects database, an implementation database, a billing database, an audit database and an information data capsule storage facility.

8. The system defined by claim 4 wherein said data storage device comprises an admin database, an end user database, an implementation objects database, an implementation database, a billing database, an audit database and an information data capsule storage facility.

9. A method to enable the implementation and integration of technology systems comprising the steps of:
   a) using a control unit subsystem to i) search for and analyze information, ii) create implementation data capsules, and iii) extract objects from said implementation data capsules;
   b) using an implementation management subsystem to i) collect and manage implementation data, ii) create an optimal implementation plan;
   c) using an end user interface subsystem to i) receive end user requests for processing to be performed by said control unit subsystem and said implementation management subsystem, ii) pass said requests to said control unit subsystem and said implementation management subsystem, and iii) receive results of said requests from said control unit subsystem and said implementation management subsystem;
   d) using an administration interface subsystem to i) receive administrative user requests for processing to be performed by said control unit subsystem and said implementation management subsystem, ii) pass said requests to said control unit subsystem and said implementation management subsystem, and iii) receive results of said requests from said control unit subsystem and said implementation management subsystem.

10. The method defined by claim 9 wherein said implementation data capsules are each created as a digital package by the steps of:
   a) storing implementation objects in an implementation objects database within said digital package;
   b) storing an index of implementations represented in said implementation management subsystem in an implementation database within said digital package;
   c) storing index information and an inventory for the implementation objects and data in control files contained in said digital package within said digital package; and
   d) storing a subset of implementation objects and implementation data available in said control unit subsystem and said implementation management subsystem in an implementation deliverables storage within said digital package.

* * * * *